(12) United States Patent
Atkinson

(10) Patent No.: US 6,498,460 B1
(45) Date of Patent: Dec. 24, 2002

(54) PRIORITIZATION-BASED POWER MANAGEMENT PROTOCOL IN A COMPUTER SYSTEM

(75) Inventor: Lee W. Atkinson, Houston, TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 10/017,018

(22) Filed: Dec. 14, 2001

(51) Int. Cl.[7] .............................................. H01M 10/44
(52) U.S. Cl. ...................................................... 320/135
(58) Field of Search ................................. 320/127, 128, 320/132, 135, 137, DIG. 11; 363/15, 19, 21

(56) References Cited

U.S. PATENT DOCUMENTS 5,382,893 A * 1/1995 Dehnel 5,939,862 A * 8/1999 Kates et al.

* cited by examiner

Primary Examiner—Edward H. Tso
(74) Attorney, Agent, or Firm—Conley, Rose & Tayon, P.C.; Michael F. Heim; Jonathan M. Harris

(57) ABSTRACT

A power management scheme for a computer system prioritizes battery charging. The scheme includes determining when the output of a power adapter, which powers a computer and a battery subsystem, has reached or is about to reach a threshold which may be the power budget for the computer system. When this happens, rather than throttling battery charging, the system throttles back an aspect of the computer. Alternatively, after the computer has been throttled back, if the power budget still is being exceeded or is about to be exceeded again, then battery charging can be throttled back. In yet another embodiment, battery charging can be throttled first, followed, if necessary, by computer throttling.

32 Claims, 2 Drawing Sheets

PRIORITIZATION-BASED POWER MANAGEMENT PROTOCOL IN A COMPUTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a battery-powered electronic device. More particularly, the invention relates to a power management protocol in which various system functions can be prioritized when the system conserves power.

2. Background of the Invention

Most every computer system with a rechargeable battery uses an external AC to DC converter (sometimes called an "adapter") which converts the AC line voltage to a lower DC voltage. Due to its size, the adapter has often been referred to as the "brick." The brick is usually external to the computer shell and is often an awkward part of the system to store and carry. While using AC power, the brick supplies power both for the normal operation of the computer and also for recharging the battery.

Typical AC/DC converters are provided with an input of 100 to 240 VAC and generate an output voltage of 18 VDC with a total power output capacity of 50 to 70 watts. The size (i.e., power capacity) of the AC adapter is normally established by estimating a reasonable "power budget" for the CPU. The power budget is a total of the maximum power consumption of the computer's internal devices (the CPU, core chipset, LCD panel, hard drive, etc.) plus some allocation for externally powered devices (e.g., USB, PS/2, or external storage). As discussed below, sometimes the power required for charging the battery is added to the power budget.

Older notebook computers with small LCD screens and low power processors typically consumed a maximum of 10 or 15 watts while operational. Today's notebooks, however, with 15" high resolution screen, multiple internal storage drives, and gigahertz processors can easily consume 50 to 60 watts of power. Moreover, performance requirements have demanded bigger AC/DC adapters which are designed to be sufficient for the worst case power consumption of the system.

While the power demands for portable computers continuously increases, the pressure to make the system "mobile" places pressure on the system designer to make the AC/DC brick as small as possible. Ergonomics discourages large AC/DC adapters which dissipate proportionately more heat. Further, cost pressures prohibit the use of more powerful or more efficient AC/DC bricks. Yet, at the same time, it is desirable for the computer to be able to charge the battery as quickly as possible. In sum, many consumers desire portables that have high performance (e.g., fast CPUs, bright displays, etc.), recharge batteries very quickly, are lightweight and small, inexpensive, and do not become hot to the touch.

To date, the concession to AC/DC size has been to "throttle" battery charge when the rest of the system is under full loading. In many older systems, the "power budget" and AC/DC adapter size were calculated by estimating the consumption of the computer's devices, and then adding an amount of power allocated directly for recharging the internal battery. Today, the one common concession towards power budget allocation is that power for the recharge of the battery itself is not included. This means that most adapters today are rated to provide sufficient power for the system at full load but not charging the battery. Thus, notebooks today measure the core system power consumption and then allocate the remaining AC/DC power (if there is any remaining power) to charge the battery. Examples of these types of systems are the Compaq Armada "constant power" AC/DC converter computers (starting with the Armada 4000, 1500 and continuing until the Armada 7800) and "constant voltage AC adapter" systems, as featured by Dell Computer's "ExpressCharge" (U.S. Pat. No. 5,939,862). In these systems the power capability of the AC adapter is prioritized to maintain operation of the CPU and other core logic, and if there is any left over power, such power is allocated for battery charging. If there is no power in excess of the power required by the CPU and core logic, then the battery will not be charged.

Although generally satisfactory, such power management systems have two notable shortcomings. First, under heavy CPU usage, the power consumed by the notebook may nearly consume all of the power available from the AC adapter, so that little power is available for battery charging. This may cause the system to take an annoying long period of time (e.g., hours) to recharge the battery. Second, under worst case loading of the system, it is possible to exceed the power output capability of the AC/DC adapter. This can happen, for example, if an operator connects peripheral devices (e.g., PCMCIA cards, USB devices, etc.) that cause the total power consumption of the system to exceed the power rating of the AC adapter. Under such a condition, the AC adapter may "collapse" thereby disabling its output power to the system which, in turn, causes the system to "crash." A solution to the aforementioned problems is needed.

BRIEF SUMMARY OF THE INVENTION

The problems noted above are solved in large part by a power management scheme for a computer system that prioritizes battery charging. The scheme includes determining when the output of a power adapter, which powers a computer and a battery subsystem, has reached or is about to reach a threshold which may be the power budget for the computer system. When this happens, rather than throttling battery charging, the system throttles back an aspect of the computer (e.g., CPU speed, display brightness). This keeps the battery charging at a faster rate than would have occurred in conventional power management schemes. Determining when the power budget is about to be exceeded can be accomplished by measuring the output current of the adapter or by monitoring the charge on the battery.

In an alternative power management scheme, after the computer has been throttled back, if the power budget still is being exceeded or is about to be exceeded again, then battery charging can be throttled back. This alternative scheme thus provides a two-tiered throttling protocol. In yet another embodiment, battery charging can be throttled first, followed, if necessary, by computer throttling.

These and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, the term "throttling" or "throttling back" a device or system means to change the operating state of the device or system so that the device/system draws less power. For example, throttling back a CPU may include reducing the clock frequency of the CPU. Throttling back a LCD display can be accomplished by dimming the display. To the extent that any term is not specially defined in this specification, the intent is that the term is to be given its plain and ordinary meaning.

DETAILED DESCRIPTION OF THE PREFERRED EMBODIMENTS

Figure 1:
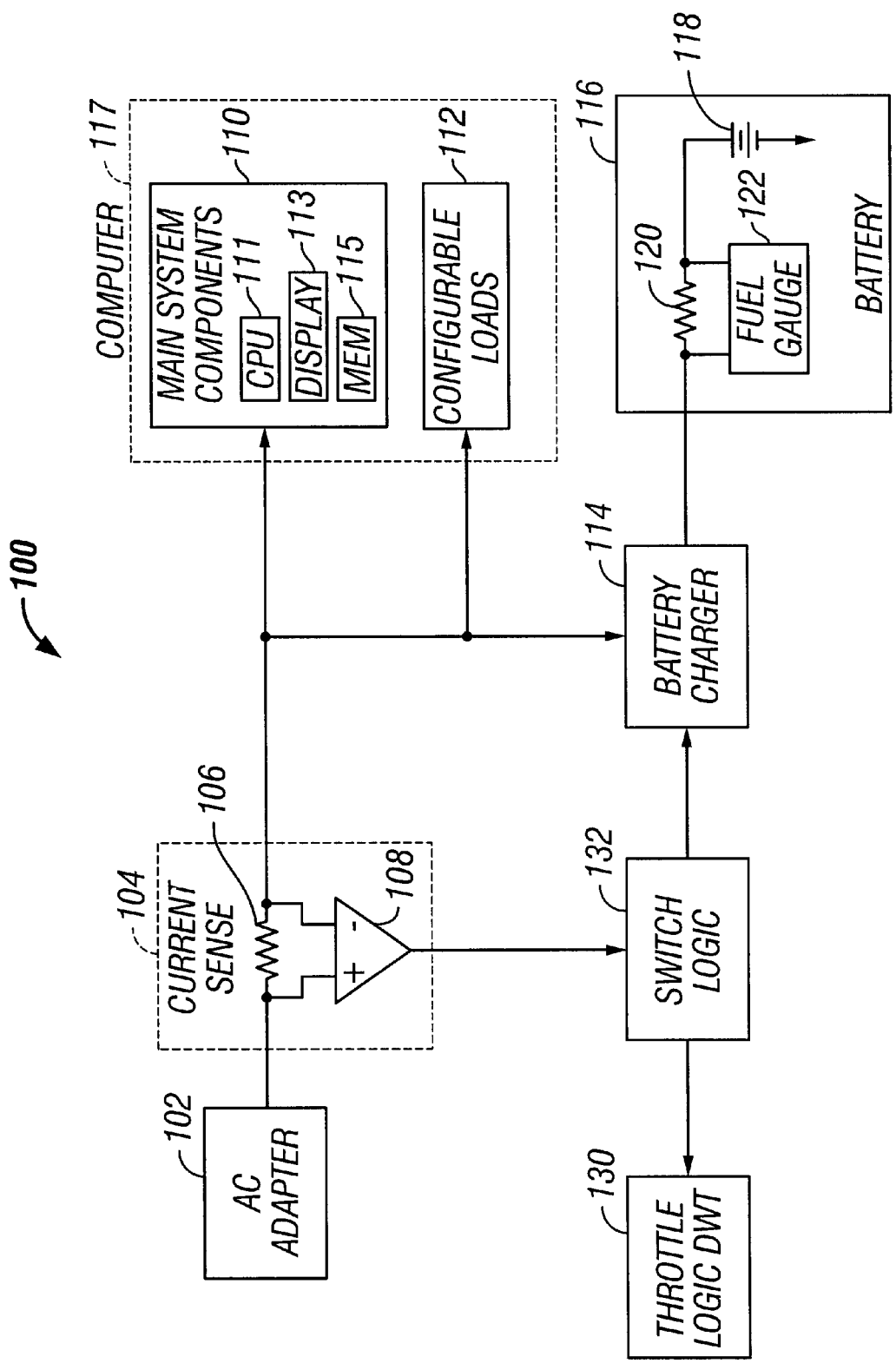
FIG. 1 shows a preferred embodiment of the invention including logic to throttle back non-battery devices when needed.

Referring now to FIG. 1, computer system 100, constructed in accordance with the preferred embodiment of the invention, includes an AC adapter 102, current sense circuit 104, main computer system components 110, configurable loads 112, a battery charger 114, a battery 115, throttle logic 130 and switch logic 132. The output power from the AC adapter 102 is provided to the current sense circuit 104 and then to the main system components 110, configurable loads 112 and battery charger 114. The output signal from the current sense circuit 104 preferably is provided to the switch which can provide the current sense signal either to the battery charger 114, throttle logic 130, or both as desired and explained below.

The AC adapter 102 preferably converts the incoming AC line voltage to a lower DC output voltage (e.g., 18 VDC). The AC adapter is rated for a particular power output (e.g., 65 W). The "power budget" (i.e., the maximum power the system can draw from the adapter) is limited to the maximum power the adapter is designed to deliver.

The current sense circuit includes a low value resistor 106 (e.g., 0.1 ohms) and an amplifier 108 which has as its inverting and non-inverting inputs the voltage across the resistor 106. The voltage across the sense resistor 106, albeit relatively small, is proportional to the current from the AC adapter. That voltage is then amplified by amplifier 108 to a form more usable by the battery charger and throttle logic. Current sense circuit 104 is included as a means for directly measuring the power being demanded of the AC adapter by the computer (specifically, the aggregate of the main system components 110, configurable loads 112 and battery charging). Current sense circuit 104, however, is optional and other means are included, as described below, for measuring or estimating the power load of the system.

The main system components 110 include one or more CPUs 111, a display (e.g., an LCD display) 113, main system memory 115, and other components (e.g., chipset communication) that have been omitted for sake of clarity. In general, system components 110 represent fixed computer loads meaning that they cannot be changed (i.e., permanently removed). In addition to the main system components 110, the computer operator may desire for the system to include additional optional loads 112. Such loads might include a CD ROM drive, USB devices, PCMCIA cards, and the like.

Taken together and for purposes of this disclosure, the main system components 110 and the configurable loads 112 are called the "computer" 117. As such, an adapter 102 provides power to a computer and separately to the battery subsystem (charger 114 and battery 116) as well as throttle logic 130.

The battery charger 114 generally comprises a DC/DC converter which accepts the DC output voltage from the adapter 102 and converts and conditions that voltage to a suitable level for charging battery 116. Battery 116 at least includes one or more battery cells 118 and, if desired, may include a fuel gauge 122 (e.g., the BQ2060 by Benchmarq). The fuel gauge 122 receives as an input the voltage developed across a small value series resistor 120 and thus can monitor the current into the battery. The fuel gauge preferably includes digital logic and can provide battery health and status information such as, for example, to the CPU 111. Such status can include the level of charge on the battery as well as the instantaneous current into the cells 118.

The throttle logic 130 generally provides the functionality described below. The throttle logic may be implemented as logic separate from the main system components 110 or be implemented as part of the main system components (e.g., a south bridge device).

The switch logic 132 comprises a selectable switch that can provide the output of comparator 108 (which indicates an over current/over power condition) to either or both of the battery charger 114 and the throttle logic 130. The state of the switch logic 132 can be set by the computer's CPU depending on the power management protocol the user desires to use for the system. Such protocols are discussed below in detail.

As noted above, in conventional power management schemes, battery charging is automatically throttled back (i.e., reduced) when the system nears or reaches the power budget set by the adapter 102. This type of scheme always prioritizes system performance over battery charging time. Of course, the user does not always benefit by prioritizing system performance. Further, even after throttling down or stopping battery charging, the power budget of the AC adapter still may be exceeded by the computer.

In accordance with the preferred embodiments of the present invention, various power management protocols are provided to address these concerns. Each of these protocols will now be discussed in turn. The protocols can be preset in the system (i.e., only one protocol available in the system) or two or more of the protocols can be made available to the system. If a plurality of the following protocols are available, the user can be provided with a graphical user interface (e.g., through the "control panel") to select which protocol to use.

In accordance with one power management protocol, battery charging is prioritized over computer performance.

This means that once the system determines that the power budget is about to be exceeded, one or more aspects of the computer 117 operation is throttled back (i.e., transitioned to a less power intensive state). Without limitation, examples of throttling back the computer 117 include slowing the frequency of the CPU's clock (not specifically shown) and dimming the LCD display 113. Throttling back the CPU can occur in accordance with any one of variety of well-known techniques and dimming the display 113 can occur by setting a brightness control bit in a register (not shown) located in one of the main system components 110. By throttling back the computer 117, the system 100 draws less power and, accordingly, the power budget of the AC adapter 102 is not exceeded, while at the same time, the battery 116 continues to be charged at the maximum rate possible given the electrical characteristics of the battery.

Another power management protocol provides an enhancement to the previous protocol. This protocol provides a two-tier throttling response to a high power draw condition. The first response to a high power condition is to throttle back the computer and permit the battery to continue charging at its maximum rate. Then, if the high power condition does not subside or temporarily subsides but reoccurs, the system can throttle back battery charging to prevent the power budget from being exceeded. This protocol prioritizes battery charging, but if necessary after throttling the computer, will throttle back battery charging.

As another alternative, a two-tier throttling response can be provided which prioritizes the computer 117 over battery charging. In accordance with this protocol, when the power budget is about to be exceeded, the system 100 first throttles back battery charging to try to avoid exceeding the power budget. Then, if the high power condition does not subside or temporarily subsides but reoccurs, the system can throttle back the computer. This protocol prioritizes computer performance, but if necessary after throttling battery charging, will throttle back the computer.

The implementation of these power management protocols will now be discussed with reference to FIG. 1. To implement any of the aforementioned protocols, a mechanism is provided to determine when the power budget has been or is about to be exceeded. There are a variety of ways to make this determination. One way to determine if the power budget is about to be exceeded is by monitoring the output signal from comparator 108. That signal is asserted when the current through sense resistor 106 exceeds the comparator's threshold. That signal preferably is provided via switch logic 132 to the throttle logic 130 and/or the battery charger. Thus, the current sense circuit 104 can be used to directly measure or determine the power output of the AC adapter 102 and an over current signal can be generated therefrom so the system can react in accordance with whatever protocol is selected for the system 100.

Figure 2:
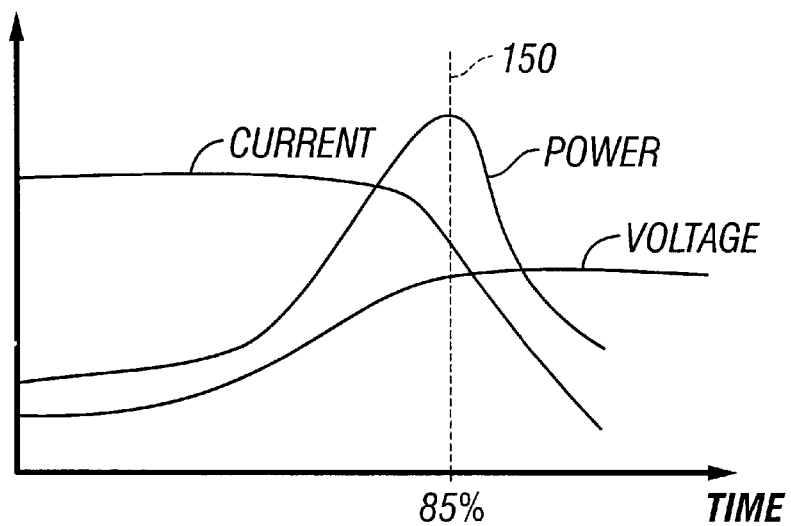
FIG. 2 shows the relationship between current, voltage and power during charging of a hypothetical battery.

The current sense circuit 104 is optional. If it is included, the circuit's output signal indicates when the power budget is about to be exceeded. If the current sense circuit is not included, the battery's fuel gauge can be used to predict when an over power condition is likely to occur. This latter approach can be explained with reference to FIG. 2. FIG. 2 shows the behavior of battery current, voltage and power during charging of a hypothetical battery. Initially, the battery voltage is at a low point and gradually increases during charging. At point 150, the battery voltage generally plateaus in to a constant voltage. Current, on the other hand, starts out relatively high during the initial period of battery charging and then at or near point 150 begins to gradually fall off. Power, which is the product of current and voltage, starts low, increases to a peak at about point 150, and then drops off. Point 150 generally represents the point at which the battery is about, for example, 85% charged. This point can be determined using battery charge status information provided by the fuel gauge 122. The battery's fuel gauge can be read by one or more of the main system components 110, such as the CPU 111, or the throttle logic 130. It can be assumed that the power budget is most likely to be exceeded at the point at which battery charging power is at its maximum (point 150).

There are least two ways the information from the fuel gauge 122 can be used to predict when an over power condition has occurred or may occur. One way is to periodically poll the fuel gauge to determine the power going into the battery. Then, at the peak power draw by the battery during charging, it can be assumed that the system may overdraw the power output of the AC adapter because of the additional power draw from the computer 117. Accordingly, the power curve shown in FIG. 2 can be tracked and in a period of time surrounding the peak power draw, an over power condition can be predicted. Numerous conventional techniques are available for analyzing the power curve to make this determination. Alternatively, because the current and voltage curves also change at approximately the peak power load, the current and voltage curves can be analyzed to provide the same information if the fuel gauge provides such information.

Another way to use fuel gauge information to predict an over power condition is to simply predict that an over power condition may be imminent from the time the battery begins charging until it reaches its peak power draw. Although this approach of course is not entirely accurate, it is simple to implement.

Regardless of how the potential for an over power condition is measured, determined or predicted, the preferred embodiments of the power management protocols discussed above throttle back, at least initially, either the computer 117 or battery charging. Methods of lower the power draw by the CPU 117 and configurable loads 112 are well known. For example, the clock frequency of the CPU can be slowed down or even stopped and/or the display 113 can be dimmed.

As explained above, the preferred embodiments of the invention include the following three power management protocols:

1. Battery Charge Prioritization—throttle back computer upon imminent over power condition.
2. Battery Charge Prioritization With Secondary Battery Throttling—throttle back computer initially and then, if necessary, throttle back battery charging.
3. Computer Prioritization With Secondary Computer Throttling—throttle back battery charging initially and then, if necessary, throttle back computer.

The first protocol listed above, Battery Charge Prioritization, can be implemented in any one of a variety of ways. Once it is determined that the AC adapter's power budget is about to be exceeded, the computer is transitioned to a lower power state. If a current sense circuit 104 is present in the system, then that circuit's output signal can be provided via switch logic 132 to throttle logic 130 as an interrupt signal. The interrupt causes the throttle logic 130 to determine the source of the interrupt and execute the appropriate interrupt service routine which will cause the computer 117 to be throttle back to a lower power state. The interrupt routine can cause the CPU 111 to operate at a lower clock frequency and/or dim the display 113 and/or effect any other computer function so as to cause the computer to lower its power load.

Alternatively, if the current sense circuit is not present or is simply not used for power management purposes, the system can throttle back the computer based on information from the fuel gauge 122. The well known Advanced Configuration and Power Interface (ACPI) standard can be used for this purpose. This implementation has knowledge of the maximum preferred charge rate of the battery, the performance state of the CPU, and whether the battery is charging. The CPU may have multiple performance states. High performance states generally are less efficient and consume more power than low performance states. Under ACPI version 2.0, these states are known as the Performance Supported States (PSS) with PS0 being the fastest state and any number of slower states (PS1 . . . PSn) of increasing lower power consumption. The battery's fuel gauge 122 can be monitored by the CPU 111 issuing an ACPI battery status command (BST). The BST command causes information to be returned from the battery including the fuel gauge capacity and the current rate of charge. Then, the rate of charge is compared to the maximum preferred rate of charge and throttles back the CPU speed to the fastest CPU speed that will preclude the power budget from being exceeded given the current battery charging load. In one embodiment and as explained above, the CPU is throttled back from the beginning of battery charging until maximum power draw. Alternatively, the CPU is throttled back only for a relatively narrow time period beginning just before maximum battery charge power draw (FIG. 2) and ending just after maximum power draw. The length of time for this period can be preset or programmable. Also, using ACPI, other computer system functions, such as display brightness, can be adjusted to vary the power load on the adapter.

The second power management scheme listed above, Battery Charge Prioritization With Secondary Battery Throttling, is implemented similar to the first power management scheme. However, in addition to throttling back the computer 117, battery charging can also be throttled back, if necessary. As such, when it is determined that the power budget of the adapter 102 is about to be exceeded, the computer 117 is throttled back. In accordance with this embodiment, a time delay is inserted to cause another assessment of the power budget to be made at some point in time after the computer has been throttled back to a lower power state. If, at that time, a potential or actual over power condition is still present, then battery charging can be throttled back by reducing the amount of charge current to the battery 116. Throttling back battery charging is well known within the art and can be implemented in the battery charger 114 by simply limiting the charge current to the battery 116.

If the current sense circuit 104 is used to determine power budget concerns, the output signal from comparator 108 is provided through switch logic 132 both to the throttle logic 130 and the battery charger 114. The throttle logic 130 responds immediately to an over power condition by causing the computer 117 to be throttled back. A time delay on the battery charger side causes the battery charger to wait for a predetermined period of time to elapse after which the comparator's output is again checked by the battery charger 114 to determine if the power budget problem has subsided. If throttling back the computer was sufficient to alleviate the power budget problem, the battery charging is not changed. If, however, throttling back the computer was not sufficient to alleviate the power budget problem as determined by the comparator 108's output signal remaining asserted after the time delay, battery charging is throttled back to further help alleviate the problem.

Figure 3:
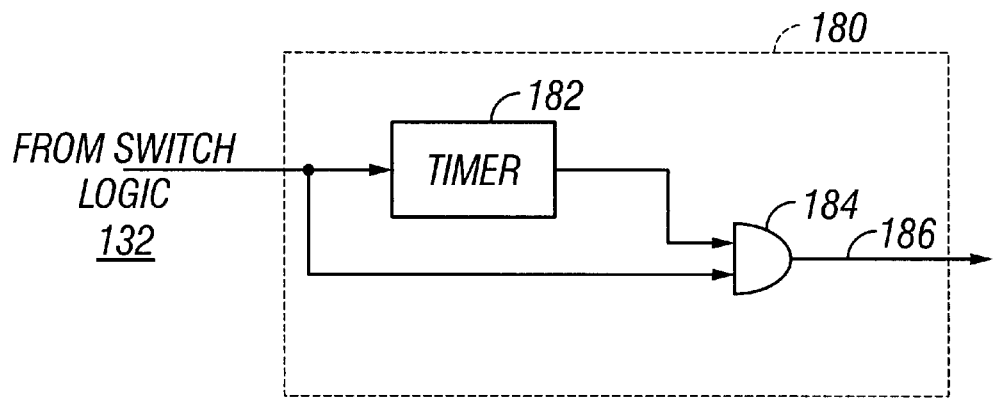
FIG. 3 shows an exemplary embodiment of a time delay circuit for use in several of the preferred embodiments discussed herein.

The time delay in the battery charger 114 can be implemented with any desired type of circuit. FIG. 3 shows one suitable circuit implementation. Time delay unit 180 includes a timer 182 and an AND gate 184. The timer 182 receives the output signal from the switch logic 132 which is asserted upon an over power condition as detected by sense circuit 104. The timer counts for a predetermined period of time, such as five seconds. The output of timer 180 will assert at the end of the predetermined period of time. The output of the timer and the switch signal are ANDed together via AND gate 184. As such, the output signal 186 of AND gate will only be asserted if, at the end of the time delay, the switch 132 signal still indicates an over power condition. Once asserted, signal 186 can then cause battery charger 114 to reduce the charge current.

The third power management scheme listed above, Computer Prioritization With Secondary Computer Throttling, is implemented in a similar manner to the second power management scheme (Battery Charging Prioritization With Secondary Battery Charging Throttling). However, battery charging is throttled back initially upon detection of a possible power budget problem and then, if necessary, the computer 117 is throttled back. A similar time delay as discussed above is included in the throttle logic 130 to cause a delayed reassessment of the power budget condition of the system.

If desired, the throttle priority protocol can be set automatically depending on the operational environment of the system. For example, computer performance could be prioritized higher than charge time for a portable system attached to a docking station or a port replicator. However, if the portable system is not docked in any manner, battery charging may be preferred to be prioritized higher than performance. It is well within the knowledge of one or ordinary skill in the art how to detect whether a portable computer is docked or not. For example, switches can be included that become closed only when the unit is docked. These switches can be polled to determine which throttle protocol to select.

The various preferred embodiments discussed above provide improved power management schemes that provide benefits and flexibility not available in conventional power management schemes. For example, the battery can be recharged must faster for the schemes that prioritized battery charging. Also, the power budget of the AC adapter is much less likely to be exceeded, particularly with the "two-tier" throttling schemes.

The above discussion is meant to be illustrative of the principles and various embodiments of the present invention. Numerous variations and modifications will become apparent to those skilled in the art once the above disclosure is fully appreciated. For example, the delay circuit explained above can be included as part of the switch logic 132. It is intended that the following claims be interpreted to embrace all such variations and modifications.

What is claimed is:

1. A power management method for a computer system which includes a computer coupled to a battery subsystem, said battery subsystem including a charger and a rechargeable battery which can be used to power said computer, said method comprising:

(a) determining the power draw on a power adapter; and (b) throttling back said computer if said power draw exceeds a threshold.

2. The method of claim 1 wherein (b) includes reducing the clock frequency to a processor in said computer.

3. The method of claim 1 wherein (b) includes dimming a display in said computer.

4. The method of claim 1 wherein (a) includes measuring the current output of said power adapter.

5. The method of claim 1 wherein (a) includes monitoring the charge on said battery.

6. The method of claim 1 including determining that the power draw exceeds a threshold from the time battery charging begins until the power consumption by the battery charger approximately reaches a maximum level.

7. A power management method for a computer system which includes a computer coupled to a battery subsystem, said battery subsystem including a charger and a rechargeable battery which can be used to power said computer, said method comprising:
   (a) determining the power draw on a power adapter;
   (b) throttling back said computer if said power draw exceeds a threshold; and
   (c) throttling back battery charging if said power draw exceeds said threshold.

8. The method of claim 7, wherein (c) occurs after (b).

9. The method of claim 7 wherein (b) includes reducing the clock frequency to a processor in said computer.

10. The method of claim 7 wherein (b) includes dimming a display in said computer.

11. The method of claim 7 wherein (a) includes measuring the current output of said power adapter.

12. The method of claim 7 wherein (a) includes monitoring the charge on said battery.

13. The method of claim 7 including determining that the power draw exceeds a threshold from the time battery charging begins until the power consumption by the battery charger approximately reaches a maximum level.

14. A computer system, comprising:
   a power adapter;
   a computer coupled to said power adapter;
   a battery charger coupled to said power adapter;
   a battery coupled to said battery charger;
   throttle logic coupled to said computer, said throttle logic throttles back said computer when the power draw on said power adapter exceeds a threshold.

15. The computer system of claim 14, wherein said computer includes a processor which operates from a clock signal at an adjustable frequency, and wherein said throttle logic throttles back the computer by causing the frequency of said clock to decrease.

16. The computer system of claim 14 wherein said computer includes a display with adjustable brightness and wherein said throttle logic throttles back the computer by causing said display to be dimmed.

17. The computer system of claim 14 wherein (a) includes measuring the current output of said power adapter.

18. The computer system of claim 14 wherein said throttle logic determines when said threshold is exceeded by monitoring the charge on said battery.

19. The computer system of claim 14 wherein said throttle logic determines when said threshold is exceeded from the time battery charging begins until the power consumption by the battery charger approximately reaches a maximum level.

20. A computer system, comprising:
   a power adapter;
   a computer coupled to said power adapter;
   a battery charger coupled to said power adapter;
   a battery coupled to said battery charger;
   throttle logic coupled to said computer, said throttle logic throttles back said computer when the power draw on said power adapter exceeds a threshold and throttles back battery charging if said power draw exceeds another threshold.

21. The computer system of claim 20, wherein said throttle logic throttles back battery charging after throttling back the computer.

22. The computer system of claim 20 wherein said throttle logic throttles back the computer after throttling back battery charging.

23. The computer system of claim 20 wherein said computer includes a display with adjustable brightness and wherein said throttle logic throttles back the computer by causing said display to be dimmed.

24. The computer system of claim 20 wherein said computer includes a processor which operates from a clock signal at an adjustable frequency, and wherein said throttle logic throttles back the computer by causing the frequency of said clock to decrease.

25. The computer system of claim 20 further including a current sense circuit coupled to the output of said power adapter and said throttle logic, and wherein said throttle logic determines if the threshold is exceeded by monitoring a signal from the current sense circuit which indicates the level of current at the output of the power adapter.

26. The computer system of claim 20 wherein said battery charger includes a fuel gauge which provides parameters regarding the charge on said battery, and wherein said throttle logic determines if the threshold is exceeded monitoring the charge on said battery.

27. The computer system of claim 20 wherein said battery charger includes a fuel gauge which provides parameters regarding the charge on said battery, and wherein said throttle logic determines that the threshold is exceeded from the time battery charging begins until the power consumption by the battery charger approximately reaches a maximum level.

28. A computer system, comprising:
   a power adapter;
   a computer coupled to said power adapter;
   a battery charger coupled to said power adapter;
   a battery coupled to said battery charger;
   a display on which a graphical user interface is provided to permit a user to select one of plurality of throttle protocols wherein said protocols at least include a protocol by which said battery charging is prioritized higher than computer performance; and
   throttle logic coupled to said computer and said battery charger, said throttle logic throttles back either said computer or said battery charger when the power draw on said power adapter exceeds a threshold in accordance with the protocol selected by a user.

29. A computer system, comprising:
   a power adapter;
   a computer coupled to said power adapter;
   a battery charger coupled to said power adapter;
   a battery coupled to said battery charger; and
   throttle logic coupled to said computer and said battery charger, said throttle logic throttles back either said computer or said battery charger when the power draw on said power adapter exceeds a threshold in accordance with a throttle protocol set in the system;
   wherein said throttle protocol is determined in accordance of whether the system is docked.

30. The system of claim 29 wherein a throttle protocol is used which prioritizes the computer over battery charging if the system is docked.

31. The system of claim 30 wherein another throttle protocol is used which prioritizes battery charging over the computer if the system is not docked.

32. The system of claim 29 wherein a throttle protocol is used which prioritizes battery charging over the computer if the system is not docked.

* * * * *